United States Patent Office 3,097,963
Patented July 16, 1963

3,097,963
SIZED GLASS FIBERS AND COMPOSITION
Remus F. Caroselli and Alfred Marzocchi, Cumberland, R.I., assignors to Owens-Corning Fiberglas Corporation, a corporation of Delaware
No Drawing. Filed Mar. 30, 1959, Ser. No. 802,601
21 Claims. (Cl. 117—126)

This invention relates to glass fibers and strands, yarns and fabrics formed thereof and a size used on the glass fiber surfaces in strand, yarn and fabric formation, and it relates more particularly to glass fibers and a forming and weaving size applied thereon.

The application of a size to glass fibers has long become accepted as a necessary practice to the use of glass fibers in formation of strands and yarns and for weaving or otherwise processing the glass fibers into various types of woven and non-woven fabrics which may be used as a textile material or as a reinforcement in the manufacture of plastics, laminates, coated fabrics, ropes, screening, and the like. The formulation of the size to be employed in combination with the glass fibers has developed into a very extensive and highly technical art in which different types of size compositions have been formulated depending upon the type of application to be made of the glass fibers and depending also on the materials to be employed in combinations therewith.

In brief, the problems arise from characteristics which are more or less peculiar to glass fibers in that the fibers formed of glass comprise non-porous, rod-like members having perfectly smooth surfaces. The principal problems may be divided into three categories:

(1) No natural bond exists between the perfectly smooth surfaces of the glass fibers which is comparable to the bonding relationship capable of being developed by the large number of fibrils extending outwardly from the surfaces of the natural wool or cotton fibers. As a result, the glass fibers tend to slip relative to each other and no bonding relationship naturally develops therebetween.

(2) The non-porous rod-like elements are subject to complete destruction by mutual abrasion such that the fibers cannot be formed into strands, yarns, fabrics or otherwise processed without some protective agent on the surfaces of the fibers.

(3) The glass fiber surfaces are hydrophilic in character such that material applied to the surfaces as a coating or as a protective agent are incapable of development of a strong bonding relationship with the glass fiber surfaces and any bond that is developed is soon dissipated by a water film which forms on the glass fiber surfaces under high humidity conditions.

Thus, if the fibers are of a continuous type and are to be formed into strands and plied into yarns for weaving, it is desirable to make use of a size which embodies a film-forming material as a protective agent and which also embodies a lubricant and in which the materials are combined in a manner to provide a desirable balance between lubricity and bonding to enable the glass fiber filaments to be held together in strand formation, yet enable sufficient relative movement between the fibers for processing into strands and yarns and for weaving the yarns into fabrics.

If the glass fibers are of the staple type, the size applied to the continuous glass fibers in strand and yarn formation is unsuitable. With staple type glass fibers it becomes necessary to make use of a size which not only protects the glass fibers and embodies a desirable balance between bonding and lubricity but which also provides some drag so that the sliver formed of the staple glass fibers can be drafted lengthwise through twisters to interfelt and align the fibers without causing a non-uniform distribution of fibers through the cross-section of the formed yarn.

When the glass fibers in strand, yarn or fabric formation are to be employed in combinations with other resinous materials in finishing the fabric or as a reinforcement in the manufacture of plastics, laminates or coated fabrics, the described forming sizes become unsuitable from the standpoint of the performance characteristics where one depends upon the ability to establish a strong bonding relationship between the coated glass fiber surfaces and the other resinous systems. Thus it becomes necessary either to remove the size previously applied to the glass fiber surfaces and modify the glass fiber surfaces by the application of an anchoring agent or else it becomes necessary specifically to formulate the size composition to provide the desired processing and performance characteristics by the use of a particular resinous system, depending upon the type of resinous material to be employed in combinations with the glass fibers or else to make use of a particular resinous system in combination with an anchoring agent.

The foregoing is representative of many years of extensive research and development which has been devoted to the subject and it forms the subject matter of many hundreds of patents on glass fiber finishing and size compositions and other glass fiber treating materials.

It will be obvious that one of the major objectives of research and development in the field of glass fibers is aimed towards the formulation of a universal size which can be applied to glass fibers to provide the desired processing and performance characteristics and it is an object of this invention to produce a universal size of the type described.

Another object is to provide a new and improved glass fiber system embodying a material on the glass fiber surfaces which is capable, in itself, of use as a glass fiber size and which may be employed in combinations with other ingredients to produce a glass fiber size composition having improved processing and performance characteristics and it is a related object to produce a new and improved forming size for glass fibers.

The concepts of this invention are embodied in a glass fiber sized, preferably in forming, with a composition containing as an essential ingredient a compound or material which may be defined as a cationic modification of a polyester resin. More specifically, the material may be defined as a reaction product of an unsaturated dibasic acid with a dihydric alcohol to form an unsaturated polyester which is reacted further with a fatty acid derivative of imidazoline to produce a cationic-polymeric material having repeating units of fatty acid, imidazoline and polyester residues.

The material, which will hereinafter be referred to as the cationic derivative of a polyester resin, is preferably formed by reaction of an unsaturated dibasic acid or anhydride such as maleic acid or anhydride, fumaric acid or anhydride with a dihydric alcohol such as ethylene glycol, triethylene glycol, diethylene glycol, propylene glycol and the like, to form an unsaturated polyester resin in an intermediate stage of polymeric growth. The latter is then reacted with a fatty acid derivative of imidazoline as represented by the reaction product of an imidazoline or other diamine with a fatty acid such as stearic acid, oleic acid, palmitic acid, adipic acid, and the like long chained or short chained fatty acids. It is believed that the reaction between the reaction product of the imidazoline and fatty acid with the unsaturated polyester occurs through an unreacted hydrogen on the nitrogen of the imidazoline which adds across the unsaturated group of the dibasic acid to produce the corresponding cationic derivative of a polyester resin.

When the cationic derivative of a polyester resin is formed with a long chained fatty acid, it embodies tack sufficient to bond the glass fibers together in strand and yarn formation without development of excessive fuzzy ends. At the same time, it makes available the drag necessary for drafting a sliver of staple fibers in yarn formation. The material also embodies lubricating properties sufficient to enable the fibers to move relative to each other in the processing and in the forming steps.

The cationic derivative of the polyester resin is capable of the desired film formation to function as a protective agent on the glass fiber surfaces thereby to minimize deterioration of the glass fibers responsive to abrasive forces and also materially to improve the abrasion resistance, hand and feel of the glass fibers and fabrics formed thereof. In addition to the aforementioned combination of characteristics desired to be developed in a universal forming or finishing size, when the cationic derivative of the polyester resin is present on the glass fiber surfaces, it appears to render the glass fibers free of static formation. This has been one of the troublesome problems in the processing of glass fibers and fabrics formed thereof, even more so than with the large number of fibers and fabrics formed of other synthetic resinous materials.

The cationic derivative of a polyester resin is somewhat unlike other heterogeneous combinations of materials previously employed in the formulation of size compositions in that the material embodies groupings, such as the cationic or basic nitrogen groups, which have preferential attraction to groupings that predominate on the glass fiber surfaces so that a type of chemical-physical bond is established therebetween which enables the material to become relatively permanently bonded with the glass fiber surfaces. The material is also characterized by excellent compatibility with other resinous materials so that it can be embodied as a component with such other materials to improve the characteristics of other size compositions. It is capable also of functioning as an anchoring agent on the glass fiber surfaces to tie in other resinous materials employed in combinations with the glass fibers in the manufacture of glass fiber reinforced plastics, laminates, coated fabrics, cord and the like, or in providing a receptive base on the glass fiber surfaces for dyestuffs, varnishes, or other printing or coloring compositions employed in the manufacture of dyed or printed glass fiber fabrics. The unsaturated groupings of the polyester and the basic nitrogen groups of the imidazoline portions of the compound are capable of reaction or orientation with corresponding groupings in resinous materials employed in combinations with the glass fibers to provide a receptive base whereby such resinous materials can become strongly bonded to the heretofore repellent glass fiber surfaces.

Thus it appears that we have taken a major step toward the formulation of a universal size for use in the treatment of glass fibers in forming; which can be used to advantage either in the sizing of continuous glass fibers in strand formation or discontinuous glass fibers in yarn formation; which can be used as an anchoring agent to improve the bonding relationship of various materials with glass fiber surfaces; which can be applied to the glass fiber surfaces subsequent to forming as a protection or anchoring agent, and which need not be removed from the glass fiber surfaces when the glass fibers or fabrics formed thereof are to be employed as a reinforcement in the manufacture of glass fiber reinforced plastics, laminates, coated fabrics and other glass fiber reinforced or filled structures.

Referring to the manufacture of the cationic modification of the polyester resin, illustration will be made of a cationic modification of a polyester resin wherein the polyester is formed of maleic acid and diethylene glycol and in which the cationic modifier is formed by the reaction of imidazoline and stearic acid. It will be understood that other unsaturated dibasic acids and anhydrides and other dihydric alcohols may be used in variable proportions and that the cationic modifier may be formed by the reaction of imidazoline or other diamine with other fatty acids ranging from a short chained fatty acid of 3 carbon lengths to a long chained fatty acid of 18 to 24 carbon lengths depending somewhat upon the amount of tackiness, slip and lubricity desired in the final product. The unsaturated polyester can also be formed by reacting a saturated acid with an unsaturated alcohol. Butene diol can be reacted with succinic anhydride.

In the preparation of the cationic modification of the polyester resin, the latter component is prepared by the reaction of one molecular weight of maleic acid with one molecular weight of diethylene glycol and preferably with a slight excess of diethylene glycol up to about 15–20 percent. The reaction is carried out in the presence of a small amount of deactivator, such as hydroquinone, to prevent addition polymerization through the ethylenically unsaturated group of the anhydride and the reaction is carried out by gradually heating the mixture to a temperature of about 220° C. preferably with constant circulation of an inert gas, such as carbon dioxide or nitrogen, through the mixture and reaction kettle for carrying off the water as it is formed and to prevent oxidation of the ingredients. Reaction is continued until an acid number of about 25–35 is reached and then the polyester, in an intermediate stage of polymeric growth, is cooled as to a temperature between 30–50° F.

The imidazoline component for modification can be prepared by the reaction of the fatty acid (stearic acid) with diethylene triamine in equimolecular proportions and preferably with a slight excess of the diethylene triamine. Enough xylene, toluene, or other aromatic solvent is added to eliminate the water produced in the reaction. The reaction is carried out by heating the materials to a temperature of about 180–190° C. after which the imidazoline-fatty acid reaction product is cooled to about 80° C. for subsequent admixture with the unsaturated polyester.

The reaction between the fatty acid imidazoline and the unsaturated polyester is exothermic such that it becomes desirable to extract heat from the mixture to maintain the temperature between 100–110° C. to minimize the amidization of ester groups in the polyester. The reaction is continued until the entire product becomes water soluble, usually this will take from 15–20 minutes under the conditions described. A suitable cationic modification of a polyester is made available by Quaker Chemical Company of Conshohocken, Pennsylvania, under the designation X1104. The following is representative of the equations involved in the foregoing reactions:

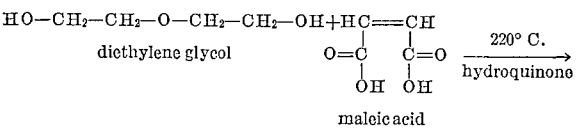

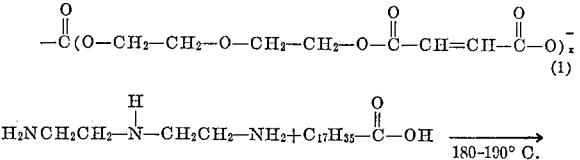

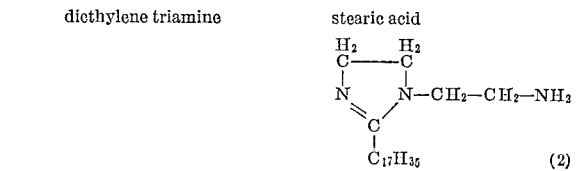

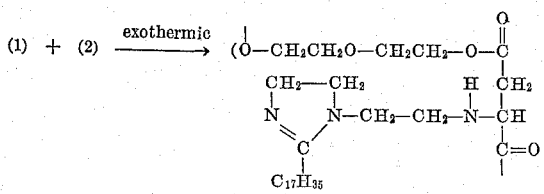

In general, it is desirable to calculate for a ratio of polyester to imidazoline on the basis of one molecular weight of imidazoline per mol of dibasic acid in the polymer or per unsaturated group in the polyester. In actual practice, this amounts to 80–90 percent by weight imidazoline per double bond.

Substitution may be made of other dibasic acids and anhydrides such as maleic anhydride, fumaric acid or anhydride and the like in equal proportions for the maleic acid. Other dihydric alcohols such as ethylene glycol, triethylene glycol, propylene glycol, dipropylene glycol, butylene glycol, and the like dihydric alcohols can be substituted for the diethylene glycol in the foregoing preparation in equimolecular amounts. Other amines such as ethylene diamine and the like alkyl polyamines can be substituted for the diethylene triamine in forming the imidazoline and fatty acids such as oleic acid, palmitic acid, octanoic acid, adipic acid and the like may be substituted for the stearic acid in the foregoing preparation in substantially equimolecular ratios. The fatty acid component is somewhat controlling with respect to the tackiness, the lubricity and the slip provided by the composition when applied to the glass fiber surfaces. The higher the fatty acid from the standpoint of the chain length, the greater the amount of tackiness, slip and lubricity while decrease in the length of the carbon chain of the fatty acid will tend to provide less tackiness and slip. For example, the use of stearic acid as a component in the manufacture of the cationic modification of the polyester resin provides a product which is tacky, which has a high degree of lubricity and gives high slip. Thus the stearic acid modification can be used effectively as a size for continuous or staple fibers where tack operates to hold the fibers together in yarn formation and to provide a desirable drag in drafting while high slip and lubrication are desirable from a handling standpoint. When less slip and less tackiness are desired, use can be made of a lower fatty acid such as adipic acid and the like.

The following are representative of forming sizes embodying the cationic modification of a polyester resin as essential components thereof:

*Example 1*

1–8 percent by weight of a cationic modification of a polyester resin (X1104, Quaker Chemical Company, Conshohocken, Pennsylvania)
99–92 percent by weight of water

*Example 2*

2.0 percent by weight maleic anhydride-diethylene glycol condensation product reacted with stearyl imidazoline on an equimolecular basis (Quaker X1104)
0.3 percent by weight glass fiber lubricant (pelargonate amide solubilized with acetic acid)
97.7 percent by weight water

*Example 3*

3.5 percent by weight maleic acid-diethylene glycol condensation product reacted with adipic acid-imidazoline reaction product on an equimolecular basis
0.4 percent by weight of a glass fiber lubricant (pelargonate amide solubilized with acetic acid)
96.1 percent by weight water The size composition is applied in the usual manner to the glass fiber surfaces in conjunction with their forming operation. In the forming of continuous textile fibers of glass, the size is applied onto the glass fiber surfaces as the molten streams of glass are attenuated and gathered together to form the strands. Application is made by a wiper pad, roller coater or the like in an amount to provide 0.1–0.5 percent ignition loss.

In the formation of yarns of discontinuous or staple fibers, the size composition can be sprayed onto the fiber surfaces as the fibers are deposited onto a collecting drum or gathered together into a sliver for drafting and twisting.

Application can also be made after the fibers have been gathered together into the sliver, but before drafting. In the yarn, the size is applied in an amount to provide 0.2–1.0 percent ignition loss.

A size composition which has been found to give excellent results in strand formation to permit weaving without warp sizing is characterized by the combination of the cationic derivative of the polyester resin with a polyhydric alcohol polymer ester of a fatty acid. The latter comprises the polymer of a polyglycol, such as ethylene glycol, diethylene glycol, propylene glycol, and the like before or after esterification with a fatty acid such as stearic acid, palmitic acid, oleic acid and the like to form a polyethylene glycol monostearate as an example. The latter appears to contribute to the lubricity and bonding of the glass fiber filaments in the strand, yarn or fabric without interfering with the desirable characteristics of the cationic derivative of the polyester resin. In fact, the polyglycol ester appears to function in combination with the cationic derivative of the polyester to enhance the functional and performance characteristics thereof as a size or finish on the glass fiber surfaces. It is desirable to provide a soft bond which allows the yarn to bend without filament separation.

In the foregoing modification, it is desirable to make use of a polyhydric alcohol polymer having a molecular weight greater than 200 but less than 2000. It will be understood that lower polymers can be used including the polyhydric alcohol.

The following are representative of size compositions embodying the aforementioned modification of this invention:

*Example 4*

1–6 percent by weight polyhydric alcohol polymer monofatty acid ester
1.5–8 percent by weight cationic modification of a polyester resin (Quaker X1104)
97.5–86 percent by weight water

*Example 5*

2.5 percent by weight polyethylene glycol 1500 monostearate
1.5 percent by weight maleic anhydride-diethylene glycol condensation product reacted with stearyl imidazoline
96 percent by weight water Application to the cleaned glass fibers, as provided by the glass fibers in forming or as provided by the glass fibers after the original size has been removed, is made in the manner described in Examples 1–3 and application is made in equivalent amounts when measured from the standpoint of ignition loss.

An important concept of this invention resides in the further combination of glass fibers and a size formulated of the cationic modification of the polyester resin with a particulate material, alone or in combination with a previously described polyhydric alcohol polymer-fatty acid ester. The particulate materials function materially to reduce tension and they contribute also to the lubricity and bonding provided by the cationic modification of the polyester resin and combinations thereof with the polyhydric alcohol fatty acid ester. The resulting size composition is also characterized by providing improved hand and feel in the strands, yarns and fabrics formed of the glass fibers whereby a substantially universal forming size is provided. For this purpose, use can be made of a small amount of a cellulose pulp, as represented by glassine pulp. While not equivalent to cellulose pulp, desirable results are also secured by the use of other particulated materials in the form of organic resinous polymers introduced as suspensions or emulsions such as a suspension of polytetrafluoroethylene, an emulsion of polyethylene, an emulsion of polyvinyl acetate or polyvinylidene chloride and the like. These materials form particles in the coating as distinguished from a continuous film to break up the smoothness and continuity and to provide islands or bearing points for flexure of the coating. The use of these materials in the described size compositions results in a marked decrease in drag of glass yarns as represented by a reduction in tension from 80 grams to 30 grams when comparing a size composition formulated with or without the particulate component with the cationic modification of a polyester resin size.

In a size composition, it is undesirable to make use of more than 5 percent by weight of the pulp or other particulate material in the treating composition and the preferred range is an amount less than 2 percent and within the range of 0.1–1 percent. The other ingredients can be employed in amounts and in proportions as previously described.

The following are examples of size compositions embodying the described concepts:

Example 6

1–6 percent by weight of a polyhydric alcohol polymer-fatty acid ester
1–8 percent by weight of a cationic modification of a polyester resin
0.1–1 percent by weight glassine pulp
0.05–0.3 percent by weight glass fiber lubricant
97.85–84.7 percent by weight water

Example 7

2.1 percent by weight maleic acid-diethylene glycol condensation product modified with stearyl-imidazoline on an equimolecular basis
5 percent by weight polyethylene emulsion containing 25% by weight of polyethylene resin
0.2 percent by weight of a glass fiber lubricant
92.7 percent by weight water

Example 8

2.6 percent by weight maleic acid-diethylene glycol condensation product modified with stearyl imidazoline on an equimolecular basis
.37 percent by weight polyethylene glycol 20,000 average molecular weight
5.6 percent by weight polyethylene emulsion 25% by weight solids (Bradford Soap and Dye Co.)
0.1 percent by weight glass fiber lubricant
91.33 percent by weight water

Example 9

2.0 percent by weight polyethylene glycol 400 mono-palmitate
2.0 percent by weight adipic anhydride-diethylene glycol condensation product reacted with stearyl imidazoline
0.2 percent by weight glass fiber lubricant (pelargonate amide solubilized with stearic acid)
95.8 percent by weight water

Example 10

1.5–8.0 percent by weight fumaric acid-polyethylene glycol condensation product reacted with oleyl imidazoline
0.1–0.5 percent by weight cellulose pulp
98.4–91.5 percent by weight water Application to clean glass fibers, as previously described, is made by a roller coater, spray coater, or by a wiper pad as the glass fibers are gathered together in strand or yarn formation. Application is made in an amount to provide an ignition loss within the range of 0.1–1.0 percent. Although it is not preferred, the ignition loss can go as high as 2 percent or more.

The following will represent other specific formulations embodying the cationic modification of a polyester resin as an essential component in combination with other ingredients incorporated for various purposes in the size composition.

A size applied to glass fibers for weaving and for use in combination with epoxy resins:

Example 11

4.0–8.0 percent by weight cationic modification of a polyester resin (maleic anhydride-diethylene glycol condensation product reacted with stearyl imidazoline)
0.3–1.0 percent by weight gamma-aminopropyl triethoxysilane
0.3–1.0 percent by weight glycerine
1.0–4.0 percent by weight polyethylene glycol 1500 mono-stearate
94.4–86 percent by weight water

Example 12

4.0–8.0 percent by weight cationic modification of a polyester resin (maleic anhydric-diethylene glycol condensation product reacted with stearyl imidazoline)
0.3–1.0 percent by weight gamma-aminopropyl triethoxysilane
1.0–4.0 percent by weight polyethylene glycol 1500 mono-stearate
94.7–87 percent by weight water

Example 13

4.0–8.0 percent by weight cationic modification of a polyester resin (maleic anhydride-diethylene glycol condensation product reacted with stearyl imidazoline)
0.3–1.0 percent by weight gamma-aminopropyl triethoxysilane
0.3–1.0 percent by weight glycerine
95.4–90 percent by weight water

Example 14

4.0–8.0 percent by weight cationic modification of a polyester resin (maleic anhydride-diethylene glycol condensation product reacted with stearyl imidazoline)
0.3–1.0 percent by weight gamma-aminopropyl triethoxysilane
95.7–91 percent by weight water

Example 15

4.0 percent by weight cationic modification of an unsaturated polyester (maleic anhydride-ethylene glycol condensation product reacted with a fatty acid modified imidazoline)
0.3 percent by weight vinyltrichlorosilane
0.3 percent by weight glycerine
2.0 percent by weight ethylene glycol 600 mono-stearate
93.4 percent by weight water.

Example 16

1.0 percent by weight cationic modification of an unsaturated polyester (Quaker Chemical Co., X1104)
3.5 percent by weight unsaturated thermosetting resin obtained by hydrogenating an unsaturated polyester (Glidpol 1002–EN, Glidden Chemical Company)
0.05 percent by weight polyvinyl alcohol
0.05 percent by weight wetting agent (Nopcogen 16L)
0.3 percent by weight gamma-aminopropyl triethoxysilane
0.3 percent by weight glycerine
2.5 percent by weight polyvinylpyrrolidone (20% solids)
0.3 percent by weight surface active agent (Hoffman's RL–185A)
92 percent by weight water The foregoing size compositions operate to protect the glass fiber surfaces in forming and to enhance the bonding relationship between the glass fiber surfaces and resinous materials employed in combinations therewith including the epoxy resins, or other resins formed by condensation reaction between hydroxy or amino groups and other hydroxyl or carboxyl groups. The formulation containing the unsaturated vinyl functions as an anchoring agent to enhance the bonding relationship between the sized glass fibers and resinous materials formed by addition polymerization through unsaturated ethylenic or acetylenic groups.

The size compositions of Examples 11–16 may be formulated to contain other film-forming resinous materials in the combination with the cationic modification of the polyester resin including saturated polyesters, polyvinylpyrrolidones, epoxy resins, polyamides, polyacrylates, and colloids such as gelatin, casein, starches and the like.

As the coupling agents, the vinyltrichlorosilane or the gamma-aminopropyl triethoxysilane may be substituted in whole or in part with other unsaturated organo silicon compounds or other unsaturated Werner complex compounds or such organo silicon compounds or Werner complex compounds containing an active amine nitrogen. The lubricant such as the Hoffman RL–185A, which is a pelargonate amide solubilized with acetic acid, may be substituted with other glass fiber lubricating materials such as tetraethylenepentamine-stearic acid condensate solubilized with acetic acid, hydrogenated vegetable oils or the like.

We have found that the cationic modification of the polyester resin is extremely beneficial in protecting the glass fibers from breakage such that it could easily function as a single component forming size for all applications, especially if means are embodied to minimize some of the tension problems. Any tension can be alleviated, if not entirely overcome, by a suitable modification of the cationic modification of the polyester by variation of the straight chain of the fatty acid either to a shorter length or else to make use of a carboxylic acid, as represented by polyacrylic acid or a dimerized acid.

It has been found that the forming size of the cationic modification of the polyester resin would comprise a suitable base for the application of polyethylene waxes to the filaments since the stearic or other fatty acid groups present in the composition are capable of reaction with the polyethylene to enable complete compatibility. This would operate markedly to increase the wet-out characteristics for the manufacture of polyethylene coated glass fiber yarns.

Sizes formulated of the cationic modification of the polyester resin are capable of complete removal by burning out without flame in the "coronizing process" wherein the glass fibers are heated to a temperature within the range of 1100–1300° F., in an oxidizing atmosphere, for size removal to weave set and relax the glass fibers. The heat treating process is now identified by the Owens-Corning Fiberglas Corporation as the "coronizing process." Thus the size composition could be formulated to contain a coupling agent which would be left on the glass fiber surfaces after heat treatment to remove the other components of the size composition. This would result in a glass fiber, yarn or fabric with a fixed coupling agent on the surface. As the coupling agent, use can be made of the unsaturated organo silicon compounds such as vinyltrichlorosilane, vinyltriethoxysilane, vinyldichlorosilane or the compound identified as gamma-aminopropyl triethoxysilane. Use could be made of an unsaturated Werner complex compound such as methacrylato chromic chloride and the like. The following are further examples of treating compositions embodying the features of this invention and which contain an anchoring agent of the type described.

*Example 17*

1–8 percent by weight of a cationic modification of a polyester resin (X1104, Quaker Chemical Company)
1 percent by weight vinyltrichlorosilane
Remainder water

*Example 18*

2.0 percent by weight maleic anhydride-diethylene glycol condensation product reacted with stearyl imidazoline on an equimolecular basis (Quaker X1104)
0.3 percent by weight glass fiber lubricant (pelargonate amide solubilized with acetic acid)
1.0 percent by weight methacrylato chromic chloride
96.7 percent by weight water

*Example 19*

2.1 percent by weight maleic acid-diethylene glycol condensation product modified with stearyl imidazoline on an equimolecular basis
5.0 percent by weight polyethylene emulsion containing 25% by weight of polyethylene resin
0.2 percent by weight of a glass fiber lubricant
1.5 percent by weight gamma-aminopropyl triethoxysilane
91.2 percent by weight water It will be apparent from the foregoing that we have provided a number of new and improved treating compositions for glass fibers which can be applied to the glass fibers in forming as a substantially universal size to improve the processing and the performance characteristics of the glass fibers in strand and yarn formation and in the fabrication of fabric thereof to be used as a textile material or in combinations with resinous materials in the manufacture of reinforced plastics, laminates, coated fabrics, cords, and the like composite structures.

It will be understood that numerous changes may be made in the formulation of the materials and in their application onto the glass fiber surfaces without departing from the spirit of the invention, especially as defined in the following claims.

We claim:
1. Glass fibers and fabrics formed thereof and a size on the glass fiber surfaces having, as an essential ingredient, the reaction product of an imidazoline having a long chain fatty acid group in which the long chain fatty acid group contains at least 5 carbon atoms and an unsaturated polyester resin former in an uncured stage.
2. Glass fibers and fabrics as claimed in claim 1 in which the unsaturated polyester resin former comprises the condensation reaction product of a dihydric alcohol and a compound selected from the group consisting of an unsaturated dibasic acid and an unsaturated dibasic acid anhydride.
3. Glass fibers and fabrics as claimed in claim 1 in which the imidazoline derivative is formed by the reaction of an alkyl polyamine and adipic acid.
4. Glass fibers and fabrics as claimed in claim 1 in which the imidazoline derivative is formed by the reaction of an alkyl polyamine with polyacrylic acid.
5. Glass fibers and fabrics as claimed in claim 1 in which the polyester comprises the reaction product of one molecular weight of a dihydric alcohol to 1–1.15 molecular weights of a dibasic acid.
6. Glass fibers and fabrics as claimed in claim 1 in which the imidazoline has a long chain fatty acid and is formed by reaction of an alkyl polyamine and a long chain fatty acid of more than 12 carbon atoms.
7. Glass fibers and fabrics as claimed in claim 6 in which the fatty acid reacted with the alkyl polyamine comprises stearic acid.
8. Glass fibers and fabrics as claimed in claim 6 in which the fatty acid reacted with the alkyl polyamine comprises a dimerized fatty acid.
9. Glass fibers and fabrics as claimed in claim 6 in which the alkyl polyamine is selected from the group consisting of ethylene diamine and diethylene triamine.
10. Glass fibers and fabrics as claimed in claim 6 in which the alkyl polyamine and fatty acid are reacted in the ratio of one molecular weight of alkyl polyamine to 1–1.15 mols of the fatty acid.

11. Glass fibers and fabrics formed thereof and a size on the glass fiber surfaces comprising the combination of a polyhydric alcohol polymer of a fatty acid and the product of the reaction of an imidazoline having a long chain fatty acid group in which the long chain fatty acid group contains at least 5 carbon atoms and an unsaturated polyester resin former in an uncured stage.

12. Glass fibers and fabrics as claimed in claim 11 in which the polyhydric alcohol polymer of a fatty acid and the reaction product of the polyester and imidazoline are present in the ratio of 1–6 parts by weight of the polyhydric alcohol polymer to 1.5–8 parts by weight of the reaction product of the polyester and the imidazoline.

13. Glass fibers and fabrics as claimed in claim 11 in which the polyhydric alcohol polymer of which the fatty acid is formed has a molecular weight greater than 200 but less than 2000.

14. Glass fibers and fabrics formed thereof and a size on the glass fiber surfaces comprising a particulated material selected from the group consisting of a cellulose pulp and a finely divided synthetic resinous polymer and a cationic modification of a polyester resin comprising the reaction product of an imidazoline having a long chain fatty acid group in which the long chain fatty acid group contains at least 5 carbon atoms and an unsaturated polyester resin former in an uncured stage.

15. Glass fibers and fabrics as claimed in claim 14 in which the particulate component comprises a synthetic resinous material dispersed as fine particles in an aqueous medium and in which the synthetic resinous polymer is selected from the group consisting of polytetrafluoroethylene, polyethylene, polyvinyl acetate and polyvinylidene chloride.

16. Glass fibers and fabrics as claimed in claim 15 in which the particulate material is present in the size composition in an amount less than 5 percent by weight but more than 0.1 percent by weight and in which the cationic modification of the polyester resin former is present in an amount within the range of 1–8 percent by weight of the composition.

17. Glass fibers and fabrics formed thereof and a size on the glass fiber surfaces comprising an anchoring agent selected from the group consisting of an organo silicon compound in which an organic group attached to the silicon atom contains an unsaturated ethylenic group and a Werner complex compound in which the carboxylato group coordinated with the trivalent nuclear chromium atom contains an ethylenically unsaturated group, and a cationic modification of a polyester resin comprising the reaction product of an imidazoline having a long chain fatty acid group in which the long chain fatty acid group contains at least 5 carbon atoms and an unsaturated polyester resin former in an uncured stage.

18. The method of treating glass fibers comprising coating the glass fibers in forming with a size composition containing, as an essential ingredient, a cationic modification of a polyester resin comprising the product of the reaction of an imidazoline having a long chain fatty acid group in which the long chain fatty acid group contains at least 5 carbon atoms and an unsaturated polyester resin former in an uncured stage.

19. The method of treating glass fibers comprising coating the glass fibers in forming with a size composition containing a polyhydric alcohol polymer mono-fatty acid ester and a cationic modification of a polyester resin comprising the reaction product of an imidazoline having a long chain fatty acid group in which the long chain fatty acid group contains at least 5 carbon atoms and an unsaturated polyester resin former in an uncured stage.

20. The method of treating glass fibers comprising coating the glass fibers in forming with a size composition containing a dispersed component selected from the group consisting of a cellulose pulp and finely divided synthetic organic resinous polymer and a cationic modification of a polyester resin comprising the reaction product of an imidazoline having a long chain fatty acid group in which the long chain fatty acid group contains at least 5 carbon atoms and an unsaturated polyester resin former in an uncured stage.

21. The method of treating glass fibers comprising sizing the glass fibers with an aqueous composition containing an anchoring agent selected from the group consisting of an organo silicon compound in which an organic group attached directly to the silicon atom contains an unsaturated ethylenic group and a Werner complex compound in which the carboxylato group coordinated with the trivalent nuclear chromium atom contains an unsaturated ethylenic group and a cationic modification of a polyester resin comprising the reaction product of an imidazoline having a long chain fatty acid group in which the long chain fatty acid group contains at least 5 carbon atoms and an unsaturated polyester resin former in an uncured stage.

References Cited in the file of this patent

UNITED STATES PATENTS

| | | |
|---|---|---|
| 2,146,210 | Graves | Feb. 7, 1939 |
| 2,468,086 | Latham et al. | Apr. 26, 1949 |
| 2,544,668 | Goebel et al. | Mar. 13, 1951 |
| 2,552,910 | Steinman | May 15, 1951 |
| 2,563,288 | Steinman | Aug. 7, 1951 |
| 2,563,289 | Steinman | Aug. 7, 1951 |
| 2,611,718 | Steinman | Sept. 23, 1952 |
| 2,673,824 | Beifeld et al. | Mar. 30, 1954 |
| 2,754,223 | Caroselli | July 10, 1956 |
| 2,757,160 | Anderson | July 31, 1956 |
| 2,851,379 | Staudinger et al. | Sept. 9, 1958 |
| 2,891,885 | Brooks | June 23, 1959 |
| 2,931,739 | Marzocchi et al. | Apr. 5, 1960 |
| 2,932,623 | Glassen et al. | Apr. 12, 1960 |
| 2,937,230 | Rogers | May 17, 1960 |
| 2,938,812 | Marzocchi et al. | May 31, 1960 |
| 2,951,772 | Marzocchi et al. | Sept. 6, 1960 |
| 2,951,782 | Eilerman | Sept. 6, 1960 |

FOREIGN PATENTS

| | | |
|---|---|---|
| 543,092 | Canada | July 2, 1957 |

OTHER REFERENCES

"Polyesters and Their Applicants," Bjorksten Research Laboratories, Inc., Reinhold Publishing Corp., New York, 1956, lines 16–26 and 30–33, page 11.